3,654,261
QUATERNARY AMMONIUM ALKOXIDE ALKOXY POLYOL COMPOUNDS

Calvin K. Johnson, Palos Heights, Ill., assignor to CPC International Inc.
No Drawing. Filed June 27, 1968, Ser. No. 740,450
Int. Cl. C07c 47/18, 85/00
U.S. Cl. 260—210 R                     11 Claims

ABSTRACT OF THE DISCLOSURE

Covers epoxy resin compositions derived from reacting an uncured epoxy resin and an epoxy resin flexibilizer comprising a polyol quaternary ammonium alkoxide, preferably in presence of a curing agent, which resin compositions have desired strength and flexibility and resistance to chemical and solvent attack. Also covers cured epoxy resin compositions derived from the above combination of ingredients. Lastly, covers the flexibilizer compositions themselves which have the following structural formula:

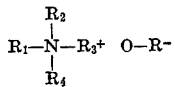

where $R_1$, $R_2$, $R_3$ and $R_4$ are selected from the group consisting of alkyl, aryl, aralkyl, cycloalkyl and cycloheteryl and R is the residue of a polyol.

---

Epoxy resins as commercially available are uncured intermediate resins or partial polymers of low molecular weight which contain an oxirane function. These resins may be either marketed in the form of liquids or low melting solid polymers commonly known as "lump" resins. The materials are not thermosetting as such, but can be converted to the infusible state by cross-linking with the aid of hardeners or curing agents and sometimes heat.

Epoxy resins are useful in a variety of applications. For example, resinous materials of this type are used as insulating coatings and are especially useful for solid dielectric and protective coverings for electrical apparatus. Again, materials of this type have been widely used as binders, coatings, impregnants, adhesives, etc. Toughness and tenacious adhesiveness make epoxy resins singualrly suited for these and other applications. In the coating area the primary use of the epoxy resins is in the field of maintenance coating such as coating metal and concrete pipes and tanks.

When used as coatings the epoxy resins are applied to a variety of substrates and then allowed to cure to give hard and infusible films. The curing may take place by means of heat application and/or catalyst promotion.

While epoxy resins have remarkable utility and effectiveness for a number of uses such as for protective covering films for numerous applications, they do have certain drawbacks. For example, if cured to hard and infusible materials by the addition of a tertiary amine catalyst or polyamines containing two or more primary and secondary amine groups, the cured resins are very brittle making them almost useless in casting, coating, adhesive and other applications which require a resin having suitable flexibility and impact strength. Therefore, a material or materials must be incorporated to the cured resins to make them sufficiently flexible and of suitable strength. Attempts to modify an epoxy resin to increase strength, flexibility and resistance to chemicals and solvents may result in a modified epoxy resin demonstrating other undesirable effects such as loss of adhesiveness, prolonged cure time, decreased hydrolytic stability of films formed therefrom, poor outdoor weatherability, decreased impact resistance, and flame resistance, etc.

In view of the above, one of the principal objects of the present invention is to provide novel epoxy resins having a high degree of flexibility and strength, but yet which are not subject to the above and other drawbacks.

Another object of the present invention is to provide novel epoxy resin compositions capable of producing semi-rigid or flexible polymers, which nevertheless have the desired high level strength and hardness.

Still another object of the present invention is to provide the above described new and improved epoxy resin compositions which may be adapted to both heat and room temperature curing techniques, and may even be cured without resort to catalytic curing agents or curatives.

A further object of the invention is to provide cured epoxy resins which may be used as castings, as films, etc. and demonstrate remarkable resistance to chemical and solvent attack.

A specific object of the invention is to provide novel compositions which when incorporated into uncured epoxy resins form unique epoxy resin compositions which after curing form flexible coatings useful as insulating materials, as maintenance coatings for pipes and tank lines, etc. or which provide tigthly adherent films to metal or other surface substrates.

Additional objects will appear hereinafter.

BROAD DESCRIPTION OF THE INVENTION

In accordance with the invention modified epoxy resin compositions have been discovered which have improved properties of flexibility and strength, and remarkable resistance to solvent and chemical attack. In their broadest aspects these epoxy resin compositions of the invention comprise the reaction product of a major amount of an epoxy resin and a minor amount of a polyol quaternary ammonium alkoxide composition which compound imparts the above desired properties to the epoxy resin. In a preferred embodiment the epoxy resin and flexiblizer are reacted or cured by means of a curing agent.

The polyol quaternary ammonium alkoxide additives which are also believed to be novel broadly have the following structural formula:

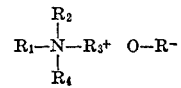

where $R_1$, $R_2$, $R_3$ and $R_4$ are selected from the group consisting of alkyl, aryl, aralkyl, cycloalkyl and cycloheteryl and R is the residue of a polyol. These compositions are made by reacting a quaternary ammonium hydroxide or alkoxide and a polyol composition, that is, a compound having at least two hydroxy radicals in its molecule. The polyol quaternary ammonium alkoxides are extremely attractive as epoxy resin additives not only due to their enhancement of desired properties of the epoxies but also because they are readily available, low priced and therefore materially decrease the overall cost of the epoxy resin formulation.

The inexpensive polyol flexibilizers are easily prepared by reacting quaternary ammonium hydroxides or alkoxides with polyols. The reaction is driven to completion by removing the water or low molecular weight alcohol by-product under vacuum. While not all the water or alcohol need be removed it is usually desirable to remove substantially all the water or alcohol condensation product formed during reaction of the quaternary ammonium with the polyol.

While the modified epoxy resin compositions have been found to have their greatest utility when used as coatings or films due to their excellent flexibility, they may also be utilized in a nuumber of other applications such as in castings work. In contradistinction to many modified epoxy resins the compositions when applied to a substrate and cured thereon form a polymeric coating or film that is sufficiently flexible, but yet possesses a high degree of strength. In many prior art instances enhanced flexibility results in a measurably lower degree of strength, and vice versa. Yet the modified epoxy resins of the invention possess both characteristics, and as well effectively resist solvent or chemical attack. Thus, the cured modified epoxy resins are particularly useful as coatings and applications where metal or another substrate is to be formed or worked after coating, or where the coated article is dented and must be beaten out.

POLYOL QUATERNARY AMMONIUM ALKOXIDES

Flexibilizers of the invention may be made by reacting a wide variety of quaternary ammonium hydroxide or alkoxide bases with a number of varying polyols. Quaternary ammonium bases that may be used include benzyltrimethylammonium hydroxide, benzyltrimethylammonium methoxide, tetramethylammonium hydroxide, tetramethylammonium methoxide, allyltrimethylammonium hydroxide, tetraethylammonium hydroxide, tetrapropylammonium hydroxide, tetrabutylammonium hydroxide, cetyltrimethylammonium hydroxide, etc. Preferred quaternary ammonium bases are those where $R_1$, $R_2$, $R_3$ and $R_4$ are lower alkyl radicals attached to the nitrogen atom, and most preferably are methyl. Another preferred quaternary ammonium base is benzyltrimethylammonium hydroxide. Thus the quaternary ammonium base reactant may be defined by the following structural formula:

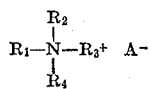

where $R_1$, $R_2$, $R_3$ and $R_4$ are as stated above, and A is a hydroxide or alkoxide anion such as methoxide.

The polyol compounds reacted with the above quaternary ammonium bases are those materials having two or more hydroxy groups which are sufficiently reactive with the quaternary ammonium bases to form the sought-after flexibilizer compound. The polyol should not contain any groups that decompose readily in the presence of strong base. Especially suitable are polyethylene oxide, polypropylene oxide, mixed polyethylene and polypropylene oxides, and other polyols such as those made by condensing simple epoxides such as ethylene oxide, propylene oxide and butylene oxide with triols, tetrols, and higher polyols. Particularly useful are propoxylated pentaerythritols and especially those having molecular weights ranging between about 400 and 900, propoxylated methyl glucoside such as those having molecular weights between 600 and 1200. Low molecular weight polyols such as ethylene glycol, triethylene glycol, tetraethylene glycol, sorbitol, glycerol, 1,2,3-butanetriol and pentaerythritol may also be used. It is understood, of course, that the polyol may contain other functional groups such as tertiary nitrogen groups in addition to the multiple hydroxyl radicals. Thus, for example, such compounds as ethylene diamine and ethanolamine may be reacted with ethylene oxide, propylene oxide, etc. to give polyols useful in the invention.

Other preferred polyols are alkoxylated carbohydrates such as ethylene or propylene oxide adducts of monoacetone glucose, diacetone glucose, dextrose, corn syrup, butyl glucoside, propylene glycol glucoside and other glycosides, starch, starch hydrolysis products, sucrose, maltose, high maltose syrups, cyclodextrins, etc.

Still other preferred polyols are polyesters having at least two terminal hydroxy groups. These hydroxy terminated polyesters having two or more hydroxy groups per average molecular weight may be also used to prepare the polyol quaternary ammonium alkoxides of the invention Particularly useful are liquid or low-melting solid hydroxy terminated polyester prepolymers made by condensing di- or poly-carboxylic acids with aliphatic di- or polyhydric alcohols. Both substituted or unsubstituted aliphatic or aromatic polyacids may be used. Included among these polyacids are adipic acid, succinic acid, sebacic acid, phthalic acid, isophthalic acid, terephthalic acid, chlorinated phthalic acid, pyromellitic acid, trimellitic acid, etc. Anhydrides of the aforesaid acids may be employed with equal effect.

Various polyhydric alcohols may be reacted with any of the above acids, mixtures of these or other polyacids to prepare the low molecular weight polyesters. Such alcohols may be mentioned, for example, as ethylene glycol, diethylene glycol, propylene glycol, 1,4-butanediol, pentaerythritol, methyl glucoside, glycerol, etc.

A number of conventional methods may be used to prepare the low molecular weight non-polymerizable polyesters useful as a polyol source. It is essential that the polyhydric alcohol be used in at least a slight excess over the polycarboxylic acid or anhydride. It is advantageous to employ from about 1.1 to 2.0 hydroxy equivalent weights of alcohol for each carboxylic acid equivalent weight. These polyesters may be conveniently prepared by heating a mixture of the polyhydric alcohol and the polycarboxylic acid or anhydride at elevated temperatures of from about 150° C. to 250° C. for a period of time ranging from about 1 to 3 hours. The water that is formed in the condensation reaction is allowed to distill out of the reaction flask or is swept out with the aid of a stream of nitrogen.

The polyol quaternary ammonium alkoxide flexibilizers are usually prepared by reacting 1 to 20 parts of a quaternary ammonium base with 100 parts of polyol. Preferably 1–10 parts of base are reacted with 100 parts of polyol, and most preferably 2–6 parts of quaternary ammonium base are reacted with 100 parts of polyol.

Greatly preferred flexibilizers have molecular weights ranging from about 60 to about 6000, and more often have molecular weights ranging from about 200 to about 6000.

One particularly desirable combination involves reaction of an alkoxylated pentaerythritol or alkoxylated methyl glucoside such as propoxylated pentaerythritol or propoxylated methyl glucoside with a tetramethylammonium hydroxide or methoxide. Reaction products of this type when incorporated into epoxy resins impart to such resins a high degree of flexibility and impact strength and unusual chemical and solvent resistance. Moreover modified epoxy resin compositions of this type are easily cured whether at room temperature or under elevated temperatures without resort to additional catalyst or curatives.

As mentioned above one greatly preferred polyol class are alkoxylated glycosides. The glycosides which are alkoxylated to form useful polyether glycosides are non-reducing monosaccharides in which an alkyl or aralkyl radical is attached to a carbonyl carbon atom through an oxygen atom. The term "non-reducing monosaccharide" denotes a simple sugar which does not reduce Fehling's solution. Thus, for example, the alkyl or aralkyl group present in the monosaccharide may be benzyl, methyl, ethyl, propyl, isopropyl, n-butyl, isobutyl, tertiary amyl, hexyl or 2-ethylhexyl. The sugar constituent of the glycoside is derived from a pentose, such as xylose, lyxose, arabinose or ribose; a hexose, such as glucose, mannose, altrose, talose, galactose, idose, gluose, fructose, allose, psicose, sorbose and tagatose; or a desoxy derivative formed by the replacement of a hydroxy substituent in the sugar with hydrogen such as the desoxyhexoses, rhamnose and fructose. The sugar constituent can be in the furanoside or pyranoside form of acetal structure.

Among the glycosides which can be employed are the alpha and beta forms of methyl-D-arabinoside, methyl-D-xyloside, ethyl-D-xyloside, n-butyl-D-riboside, methyl, ethyl, propyl, butyl, and 2-ethylhexyl-D-glucoside, 2-ethylhexyl-D-fructoside, isobutyl-D-mannoside, ethyl-D-galactoside, benzyl-D-glucoside and methyl-R-rhamnoside. The preferred glycosides are the alkyl glycosides and preferably the lower alkyl glycosides in which the alkyl group contains 1 to 6 carbon atoms. Of these, preferred are the methyl glycosides, and most preferably, propoxylated methyl glucoside.

The above-described glycosides which are used in the practice of the invention constitute a known class of materials. In general, the synthesis of glycosides may be accomplished by the Fischer method which involves reaction between simple sugars and the appropriate alcohol in the presence of an acid catalyst, or by methods based on the replacement of the halogen atom of tetraacetylglycosyl halides followed by saponification of the acetyl groups.

The glycosides which are employed may be a single compound of definite composition or a mixture of isomers. The glycoside polyethers such as the glucoside polyethers are obtained by reacting the above described glycoside compounds with an alkylene oxide, preferably ethylene oxide or propylene oxide or mixtures of these oxides. The reaction is well known, and is usually carried out by means of an alkaline catalyst such as potassium hydroxide in presence or absence of an inert solvent such as toluene, or other suitable hydrocarbon solvents. The products are usually mixtures which may be utilized as such or further refined to provide a discrete compound. As employed in the instant invention the alkoxylated glycosides usually have a molecular weight of about 400 to about 6000.

If the carbohydrate is derivatized to an insufficient extent, that is, contains an insufficient amount of polyether linkages, resultant films formed in conjunction with the above described epoxy resins do not have the desired flexibility. That is, the coating or film composition has too rigid a structure.

EPOXY RESINS

The major amount of the epoxy compositions of the invention, is, of course, an epoxy resin itself. The uncured epoxy partial polymers of interest whether liquid or solid are generally those which have a sufficiently long molecular distance between the epoxy moieties. A general class adaptable in the present invention contains terminal epoxy moieties sufficiently far apart whereby the rigidity of the molecule does not detract from the desired balanced properties.

The epoxy, or epoxide resins, as they are variously called, which may be used in the invention may comprise a polyether derivative of a polyhydric organic compound, that is, a polyhydric alcohol or phenol, which also contains epoxide groups. More often, these epoxy resins are the glycidyl ethers of polyphenols and polyalcohols. The resins may be obtained by reacting an epihalohydrin, for example, epichlorohydrin, and a phenol having at least two phenolic hydroxy groups, for example, bis-(4-hydroxy phenol)-dimethyl-methane. Generally, the epoxy resin contains more than one epoxy group per molecule, and more often from 1 to 2 or more epoxy groups per molecule and may be prepared by effecting reaction between epichlorohydrin and a polyhydroxy phenol or alcohol, for example, hydroquinone, resorcinol, glycerine, or condensation products of phenols with ketones, for instance, bis-(4-dihydroxydiphenyl)-2,2-propane.

Preferred polyhydric polynuclear phenols consist of 2 or more phenols connected by such groups as alkylene, ether, ketone or sulfone radicals. The connecting groups are further exemplified by the following compounds: bis(p-hydroxyphenyl) ether, bis(p-hydroxyphenyl) ketone, bis(p-hydroxyphenyl) methane, bis(p-hydroxyphenyl) dimethyl methane, bis(p-hydroxyphenyl) sulfone, or trisphenols or tetraphenols having the formulas:

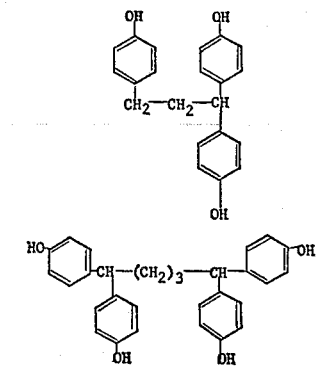

Preferred as the epihalohydrin for reaction with the above polyhydric phenols is epichlorohydrin or glycerol dichlorohydrin.

Among the suitable polyepoxides useful in the invention are the epoxy polyethers of polyhydric phenols obtained by reacting a polyhydric phenol with a halogen-containing epoxide in an alkaline medium. Suitable for example, are the polyethers obtained by reacting an excess of epichlorohydrin with 2,2-bis(4-hydroxyphenyl) propane (to obtain 2,2-bis(2,3-epoxy-propoxyphenyl) propane), resorcinol, catechol, hydroquinone, methyl resorcinol, polynuclear phenols such as 2,2-bis(4-hydroxyphenol) butane, 4,4'-dihydroxybenzophenone, bis(4-hydroxyphenyl) ethane, 2,2-bis(4-hydroxyphenyl) pentane, and 1,5-dihydroxynaphthalene. Other halogen-containing epoxides are 3-chloro-1,2-epoxybutane, 3-bromo-1,3-epoxyhexane, 3-chloro-1,2-epoxyoctane, and the like.

Preferred polyepoxides are the glycidyl polyethers of dihydric phenols obtained by reacting epichlorohydrin and a dihydric phenol in an alkaline medium. The polymeric product is generally not a single simple molecule but a mixture of glycidyl polyethers.

As stated above, preferred resins useful in the invention are the polyglycidyl ethers of polyhydric phenols. Among the suitable di- and polyunclear phenols suitable for preparation of useful polyglycidyl ethers are the bisphenols, and polyphenols such as the novolac condensation product of a phenol and a saturated or unsturated aldehyde containing on an average of from 3 to 20 or more phenylol groups per molecule. Examples of suitable polyphenols derived from a phenol and an unsaturated aldehyde, such as acrolein are the triphenylols, pentaphenylols, and heptaphenylols. Generally, these polyglycidyl ethers or polyhydric phenols are prepared by the reaction of an epihalohydrin with a polyhydric phenol under basic conditions. The polyhydric phenol can be mononuclear such as resorcinol, or hydroquinone, or may be di- or polynuclear.

The chemical structure of the most preferred resins can be represented by the following formulae:

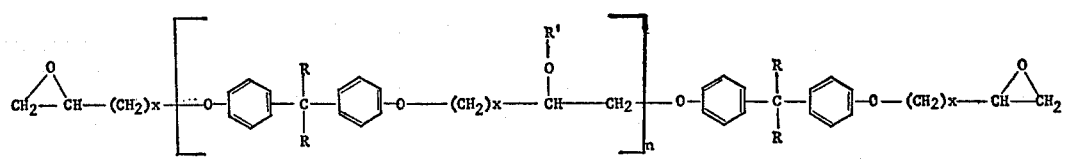

or more specifically

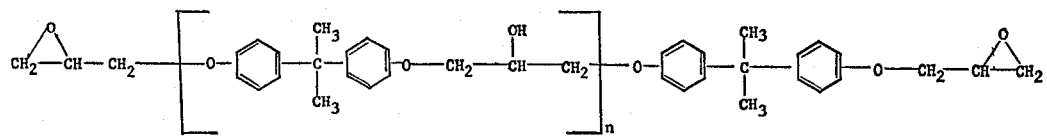

In the first formula above, R may be alkyl, of from about 1 to about 5 carbon atoms, R' may be H or alkyl of from 1 to 5 atoms; $x$ may be of from 1 to 4. The number $n$ is related to the epoxy equivalent and is explained below.

Still other epoxy resins which may be used in the invention include those containing both ester and epoxy groups. Illustrative among these are diethylene glycol bis(3,4-epoxycyclohexane-carboxylate), bis(3,4-epoxycyclohexyl-methyl)-adipate, bis(3,4-epoxycyclohexylmethyl)-phthalate, etc.

The value of the epoxy equivalent is measured by the grams of resin containing one gram equivalent of epoxide. These values can vary from 140 to 4,000, with preferred ranges of about 225 to 2,000. Doubling the value of epoxy equivalent of materials falling within the just depicted formulae gives the approximate molecular weight.

The epoxy compositions of the invention are made up simply by incorporating the flexibilizer into the uncured epoxy resin, and then curing the entire composition in whatever form is desired such as in form of a casting, thin coating, etc., preferably in presence of a curing agent. Generally 1–40 parts of flexibilizer and more often 1–30 parts are reacted with 100 parts of epoxy resin.

When used as coatings the epoxy compositions here may be applied to the substrate to be coated in a number of different manners. For example, the epoxy prepolymer or partial resin may be first partially reacted with the polyol flexibilizer and then applied to the substrate under treatment. Further polymerization of the two above materials is then carried out to form a tough adherent film. Again, the epoxy resin and flexibilizer may be merely mixed and then applied to the substrate to give hard and fusible films upon curing or reacting of the two ingredients. The epoxy resinous composition containing the polyol flexibilizer may be cured such as upon a substrate by means of heat, or at ambient temperature, with or without curing being promoted by addition of catalyst.

When the epoxy compositions of the invention are cured at room temperature they generally set up into a gel in about ½–2 hours and are usually completely cured in 12–24 hours. When cured at higher temperatures, say in the range of 80–140° C., a gel is formed in a few minutes and a hard cure is formed in 1 hour or less. It has been noted that when a catalyst is employed one not only gets a faster cure, but the film or other cured epoxy composition has better chemical and solvent resistance.

When the compositions of the invention are cured with aid of conventional curing agents with or without application of heat both acid and basic catalyst may be employed, though use of the latter is preferred.

Thus, amine curing agents may be utilized such as the following: diethylenetriamine, triethylenetetramine, tetraethylenepentamine, trimethylene diamine, mono and tridimethyl-amino methyl phenol, metaphenylene diamine, p,p' methylene dianiline, piperidine, diethanolamine, etc. Other suitable amine hardeners include: dicyandiamide, melamine, pyridine, cyclohexylamine, benzyldimethylamine, benzylamine, diethylaniline, triethanolamine, tetramethyl piperazine, N,N-dibutyl-1,3-propane diamine, N,N-diethyl-1,3-propane diamine, 1,2-diamino-2-methyl propane, 2,7-diamino-2,6-dimethyloctane, dibutylamine, dioctylamine, dinonylamine, distearylamine, diallylamine, o-tolylnaphthylamine, pyrrolidine, 2-methylpyrrolidine, tetrahydropiperidine, 2-methylpiperidine, diaminopyridine, tetramethyl pentamine imidazoles and the like, and salts of these amines. Preferred basic catalysts are dimethyl aminomethyl phenol, diethylenetriamine, triethylenetetramine and tridimethyl aminomethyl phenol.

Again acid anhydrides such as the anhydrides of dibasic acids, e.g., succinic, maleic and phthalic acids are also used as curing agents. Phthalic acid derivatives which are substituted in the nucleus are also used here, as well as hydrogenated phthalic acids. Polymerized acid anhydrides, e.g., polyadipic and polysebacic acid anhydrides can likewise be empolyed. Reactive polyamides may also be used as curatives such as polyamides obtained by reacting dimer acids and aliphatic polyamines.

Inorganic bases may also be used as catalysts to catalyze reaction between the flexibilizer and epoxy resin. However, basic organic nitrogen compounds are preferred such as the above or others, such as quaternary ammonium hydroxides wherein at least one of the alkyl groups attached to the nitrogen atom contains between about 12 and about 18 carbon atoms. Acidic substances such as phenol-formaldehyde resins may also be employed.

The amount of curing catalyst which should be present to fulfill its intended role, may be widely varied according to the type of catalyst utilized. However, in most instances about 0.1–20.0% curing catalyst or hardener based on weight of epoxy resin is employed in practicing the instant invention.

In another embodiment of the invention cured epoxy resin compositions are formed which not only have the above described flexibilizer as an ingredient but also have incorporated therein as isocyanate component. Again, the isocyanate, polyol quaternary ammonium alkoxide and epoxy resin may be first prepolymerized in solution or otherwise and then applied to the substrate upon which a film is to be laid or set up in form of a casting, or used in some other manner. Alternately, these three ingredients may be merely mixed, and then polymerized in one step to form for example useful films upon a substrate. Also, the isocyanate may be added to an already reacted mixture of epoxy resin and flexibilizer and the entire mixture laid down on a substrate and cured to film form.

The just described compositions have utility in a number of useful areas. For example, they may be used as compounds for casting, in potting and encapsulation application, as sealants, adhesives, laminates, as moldings, as foams, as impregnants, as coatings, as filament windings, etc. As mentioned above the reaction products for the invention are particularly useful as coating composition or film formers due to excellent flexibility and high strength.

Again, the substrate to which the epoxy resin compositions may be affixed can vary throughout a wide spectrum of materials. Exemplary are metals of all types as steel, glass, paper, wood, textiles, leather, flooring materials, e.g., vinyl tile, asbestos-vinyl tile, asphalt tile, masonry of all types, e.g., concrete, stone, brick, asbestos-cement shingles and siding, plastics, etc.

With specific regard to the coatings area, the compositions of the invention are especially useful in protecting structural masonry and steel work such as present in refineries, tanneries, breweries, laundries, etc., in coating storage tanks, plating shops, bar top varnishes, bridges, gas holders, meat vans, sewage works, etc. They are also useful in runway and roadway markings; as aircraft coatings, particularly jets, to resist the solvent action of hydraulic lubricants and to resist erosion at elevated temperatures and speeds; and as protective coatings on home appliances of all types.

The coatings are also useful as interior linings of static and mobile tanks and drums carrying fuels, solvents, oils, corrosive chemicals, foodstuffs, wine, beer, etc. The materials are especially suitable as interior linings since they both protect the storage vessel and prevent contamination of the stored product.

The epoxy coatings of the invention are especially useful to line the interior of tankers. Crude oil tankers alternately carry crude oil and salt water ballast and in the past heavy corrosion losses have resulted, with relatively early replacement of steel plates. The application of the epoxy coatings of the invention protect the steel of the tankers and prolong their life. In addition, they reduce repair costs due to renewal of corroded plates, heating coils and stringers. The smooth hard coatings also aid the ease and speed of cleaning of the tanks.

In special applications, the compositions may be used to encapsulate various objects such as, for example, electrical wires whereby an insulating coating is produced. Another area where a flexible yet strong coating is desired lies in treatment of substrates which are to be subsequently worked, such as by bending, etc. One particular concern here lies in coating of toothpaste tubes. Here the coatings must withstand repeated crushing and manipulation without cracking or peeling from the tube base.

The epoxy compositions whether applied in solution, or emulsion form, or directly to the substrate to be treated without benefit of any solvent may be employed for a wide variety of other applications than those just described. For example, among the best applications are as a coated abrasive binder, a size for cloth, a paper stabilizer, a paper base laminate, a glass mat and preformed binder, etc.; as a wash and wear treatment for cotton or wool, as a wood chip binder, as a binder for paper use for battery separators, as a protective coating of all types, e.g., as automobile primers or unpigmented coatings on glass and steel, as binders for non-woven textiles, as decorative coatings for bottles, etc. The epoxy resin compositions may be used to form both pigmented and clear coatings. Thus, they may be first mixed and ground with iron oxides, barytes, talc, etc., and films, cast therefrom The following examples illustrate typical preparations of compositions of the invention and their excellent performance as cured epoxy compounds for varying uses, particularly as epoxy-type coatings. The cured modified epoxy resins whether made up into films or as castings had excellent impact strength and flexibility and resistance to solvents such as acetone. All parts and percentages given below are expressed in terms of weight.

Example I

A polyol quaternary ammonium alkoxide was prepared from a pentaerythritol polyether as follows. 200 parts of a pentaerythritol polyether prepared by condensing pentaerythritol and propylene oxide to give a tetrol having a molecular weight of about 600 and a hydroxy number of 374 was mixed with 35 parts of a 24% solids solution of tetramethylammonium hydroxide in methanol. The mixture was heated between 70° C. and 80° C. under vacuum to remove the methanol solvent and water of condensation formed. The mixture was heated under vacuum until it no longer lost weight. A Karl Fischer analysis showed that only 0.2% water remained in the final product. The pentaerythritol polyether tetrol tetramethylammonium alkoxide was stable and had a viscosity of 14,240 cps.

Example II 200 parts of a polyether tetrol made from methyl glucoside and propylene oxide having a molecular weight of about 890 and a hydroxyl number of 253 was mixed with 25 parts of a 40% solution of benzyltrimethylammonium methoxide. The sample was heated under vacuum until all of the methanol solvent and the methanol formed in the reaction was removed. This gave a stable polyol quaternary ammonium alkoxide having a viscosity of 11,250 cps.

Example III

Here a polyol tetrabutylammonium alkoxide was prepared by mixing 100 parts of a tetrol made from pentaerythritol and propylene oxide which had a molecular weight of 600 and a hydroxyl number of 374 with 27.4 parts of a 26% solution of tetrabutylammonium hydroxide in methanol. The methanol solvent and the water formed by reaction of the hydroxide ion with the polyol hydroxyl groups were removed by heating and stripping the solution at reduced pressure.

Example IV

Here a pentaerythritol polyol quaternary ammonium alkoxide was made according to the directions of Example I by reacting 4 parts of tetramethylammonium hydroxide with 100 parts of a tetrol made from pentaerythritol and propylene oxide having a molecular weight of 600.

Example V

This alkoxide was made as outlined in Example IV with the exception that only 10.0 parts of tetramethylammonium hydroxide reactant solution was employed.

Example VI

The directions of Example IV were also followed in this preparation with the exception that 32 parts of tetramethylammonium hydroxide reactant solution was used here.

Example VII

In this preparation the directions of Example IV were followed with the exception that the tetrol made from pentaerythritol and propylene oxide had a molecular weight of about 500.

Example VIII

Here the directions of Example II were carried out with the exception that the methyl glucoside polyether reactant had a hydroxyl number of 200 and 12.5 parts of trimethylbenzyl ammonium methoxide solution were reacted with 100 parts of methyl glucoside polyether.

Example IX

In this run the methyl glucoside polyether reactant was one wherein a methyl glucoside-propylene oxide polyether having a hydroxyl number of 294 was then further reacted with ethylene oxide to produce a final polyol having a hydroxyl number of 260. 100 parts of this material was reacted wtih 16 parts of tetramethylammonium methoxide solution in the manner described in Example VIII.

Example X

In this synthesis a methyl glucoside polyether made from methyl glucoside and propylene oxide having a hydroxyl number of 250 was reacted with tetramethylammonium hydroxide in the manner described in Example VIII. Here 16 parts of quaternary ammonium base solution was reacted with 100 parts of methyl glucoside polyether.

Example XI

This preparation was carried out essentially according to the directions of Example I with the exception that the polyol was a triol made by reacting propylene oxide with trimethylol propane. 100 parts of this polyol, which had a molecular weight of about 1535 was reacted with 12.5 parts of trimethylbenzylammonium methoxide solution.

Example XII

This example was run according to directions of Example XI with the exception that the triol reactant had a molecular weight of about 730.

Example XIII

In this run, carried out as outlined in Example XI the triol reactant was one made by propoxylating trimethylol propane and then further reacting this material with ethylene oxide to yield a final polyol having a molecular weight of about 4500.

Example XIV

Here a polyol made by reacting ethylene oxide and polypropylene glycol was reacted with trimethylbenzyl-ammonium methoxide. 100 parts of polyol was reacted with 12.5 parts of the quaternary ammonium base solution.

Example XV

In this synthesis a triol was made by condensing propylene oxide with 2-hydroxy-1-propyl amine to yield a compound having a hydroxyl number of 302. 100 parts of this triol was reacted with 12.5 parts of trimethylbenzyl-ammonium methoxide solution.

Example XVI

Here a propoxylated sucrose polyether in an amount of 100 parts was reacted with 12.5 parts of trimethylbenzyl-ammonium methoxide solution to yield a useful quaternary ammonium polyol flexibilizer.

Example XVII

In this experiment a polyether made by condensing beta-cyclodextrin with propylene oxide was prepared which had a hydroxyl number of 345. 100 parts of this polyol was reacted with 12.5 parts of trimethylbenzyl-ammonium methoxide solution to yield a useful flexibilizer.

Example XVIII

This example illustrates use of a polyol quaternary ammonium alkoxide as a flexibilizer for epoxy resins, which alkoxide was the sole curative, with no additional catalyst being utilized.

To 100 parts of the diglycidyl ether of bisphenol-A epoxy resin, epoxy equivalent weight 195, was added 30 parts of the quaternary polyol described in Example I.

10-gram samples of this mixture were then placed in aluminum dishes, 2 inches in diameter, and heated at 120° C. for 1 hour. The samples gelled in 2 minutes at 120° C. and gave clear, tough castings after 1 hour. The castings had an impact strength of 7 in.-lb. and showed no splitting or cracking when immersed in acetone for 24 hours (ASTM Method D543-65). The percent weight gain was only 9%. When a mixture of 100 parts of this epoxy resin and 30 parts of the unmodified polyol was heated under the same conditions, the resin did not even cure.

Example XIX

Here some of the various pentaerythritol polyether flexibilizers prepared as described above were mixed with various epoxy resins and tertiary amine catalyst or poly primary and secondary amines, and then cured at 120° C. or at 25° C. Castings were then made by placing 10-gram samples of the resin compositions in flat aluminum dishes having a diameter of 2 inches. The acetone resistances were determined by the above ASTM method and impact strengths of the castings were determined using a Gardner Heavy-Duty Impact Tester with a 2-lb. falling weight.

As can be seen below those epoxide resins made up by utilizing the quaternary ammonium polyols of the invention as extenders and flexibilizers had excellent resistance to acetone and good impact strength. Correspondingly, the epoxy resins made up from only unmodified polyols formed castings which completely fell apart when subjected to acetone.

TABLE I

| Epoxy resin | Flexibilizer | Curing agent | Curing temperature, °C. | Cure time Days | Cure time Hr. | Impact, inch-pounds | Acetone resistance, percent weight change |
|---|---|---|---|---|---|---|---|
| DGEBA[1], 100 parts | PPE-600[2], 20 parts | TETA[3], 9 parts | 120 | | 1 | 6 | Sample fell apart. |
| | Example IV, 20 parts | do | 120 | | 1 | 8 | +2.4, no splitting. |
| | do | TETA, 7 parts | 120 | | 1 | 9 | +3.3, no splitting. |
| | Example V, 20 parts | N,N-dimethylbenzylamine, 10 parts | 120 | | 1 | 6 | No splitting. |
| | PPE-600, 20 parts | do | 120 | | 1 | 3 | Sample fell apart. |
| | Example VI, 20 parts | TETA, 9 parts | 120 | | 1 | 5 | +2.7. |
| | PPE-500[4], 20 parts | do | 25 | 5 | | 3 | Sample fell apart. |
| | Example VII | do | 25 | 5 | | 4 | +34, no splitting, good appearance. |
| Novolac Epoxy[5], 100 parts | PPE-600, 20 parts | TETA, 10 parts | 120 | | 1 | 6 | +7. |
| | Example I, 20 parts | do | 120 | | 1 | 7 | +1.6. |

[1] DGEBA=Diglycidal ether of Bisphenol-A having an epoxy equivalent weight of 195.
[2] PPE-600=Polyether tetrol made from pentaerythritol and propylene oxide having a molecular weight of about 600.
[3] TETA=Triethylene tetramine.
[4] PPE-500=Pentaerythritol-propylene oxide polyether having a molecular weight of about 500.
[5] Novolac epoxy=A polyglycidal ether of a novolac resin (epoxy equivalent weight=175).

Example XX

Again, typical flexibilizers of the invention prepared as described above were tested as outlined in Example XIX. Results appear below in Table II. Again those epoxy resins containing the flexibilizers of the invention were clearly superior to resins containing unmodified polyol flexibilizers. The epoxy prepolymer in all cases was 100 parts DGEBA.

TABLE II

| Flexibilizer | Curing agent | Curing temperature, °C. | Cure time Days | Cure time Hr. | Impact, inch-pounds | Acetone resistance, percent weight change |
|---|---|---|---|---|---|---|
| MGPE[1], 200 OH Number, 20 parts | DMP-30[2], 8 parts | 120 | | 1 | 5 | Sample fell apart. |
| Example VIII, 20 parts | {DMP-30,[2] 8 parts | 120 | | 1 | 4 | +20.5, no splitting. |
| | {TETA, 9 parts | 120 | | 1 | 6 | +8.2, no splitting. |
| MGPE, 200 OH Number, 20 parts | TETA, 9 parts | 120 | | 1 | 5 | Sample fell apart. |
| MGPE, 253 OH Number, 20 parts | do | 120 | | 1 | 4 | Do. |
| Example IX, 20 parts | {DMP-30, 8 parts | 120 | | 1 | 10 | +17.4, no splitting. |
| | {TETA, 9 parts | 120 | | 1 | 7 | +4.7, no splitting. |
| MGPEE[3], 260 OH Number, 20 parts | TETA, 9 parts | 120 | | 1 | 5 | Sample fell apart. |
| MGPE 250 OH Number, 20 parts | TETA, 11 parts | 25 | 5 | | | Do. |
| Example X | do | 25 | 5 | | | Good appearance, no splitting. |

[1] MGPE—Methyl glucoside polyester made from methyl glucoside and propylene oxide.
[2] DMP-30=Tris(dimethylaminomethyl) phenol.
[3] MGPEE=Methyl glucoside-propylene oxide polyether with hydroxyl number 294 which has been reacted with sufficient ethylene oxide to lower the hydorxyl number to 260.

Example XXI

In this series of runs further flexibilizers of the invention were used to modify an epoxy resin comprising a liquid diglycidal ether of Bisphenol-A having an epoxy equivalent weight of 195.

Example XXIII

This example demonstrates the use of a mixture of a reactive polyamide and a polyol quaternary ammonium alkoxide to cure epoxy coatings. A 75% solids toluene solution of liquid epoxy resin made by condensing bis-

TABLE III

| Flexibilizer | Curing agent | Cure time, hours | Cure temperature, °C. | Impact, inch-pounds | Acetone resistance, percent weight change |
|---|---|---|---|---|---|
| TP-1540,[1] 20 parts | DMP-30, 8 parts | 1 | 120 | 5 | Sample fell apart. |
| Example XI, 20 parts | do | 1 | 120 | 6 | Very slight splitting. |
| TP-740,[2] 20 parts | do | 1 | 120 | 4 | Sample fell apart. |
| Example XII, 20 parts | do | 1 | 120 | 4 | +19.0, No splitting. |
| TPE-4542,[3] 20 parts | do | 1 | 120 | 4 | +26.9. |
| Example XIII, 20 parts | do | 1 | 120 | 9 | +23.4. |
| L-31,[4] 20 parts | TETA, 9 phr | 1 | 120 | 4 | Sample split. |
| Example XIV, 20 parts | do | 1 | 120 | 4 | +6.3, No splitting. |
| MIPA,[5] 302 OH number, 20 parts. | TETA, 9 phr | 1 | 120 | 9 | Sample fell apart. |
| Example XV, 20 parts | do | 1 | 120 | 7 | +7.4, No splitting good appearance. |
| PPG-6402,[6] 20 parts | do | 1 | 120 | 7 | +15.4, Slight splitting. |
| Example XVI, 20 parts | do | 1 | 120 | 10 | +1.3, No splitting very good appearance. |
| CDP,[7] 20 parts | DMP-30, 8 parts | 1 | 120 | 5 | +20.2, Slight splitting. |
| Example XVII, 20 parts | do | 1 | 120 | 6 | +14.8, No splitting. |

[1] TP-1540=Triol made from trimethylol propane and propylene oxide having a molecular weight of ~1,535.
[2] TP-740=Triol made from trimethylol propane and propylene oxide having a molecualr weight of ~730.
[3] TPE-4542=Triol made from trimethylol propane and propylene oxide which is terminated with ethylene oxide and has a molecular weight of ~4,500.
[4] L-31=Polypropylene glycol that is terminated with two ethylene oxide blocks, molecular weight=1,100.
[5] MIPA=Triol made by condensing propylene oxide with 2-hydroxy-1-propylamine, hydroxyl number—302.
[6] PPG-6402=A sucrose polyether—made from sucrose and propylene oxide available commercially from Pittsburg Plate Glass.
[7] CDP=A polyether made by condensing β-cyclodextrin with propylene oxide, hydroxyl number=345.

Example XXII

Tough, flexible, cured epoxy coatings can be obtained using the polyol quaternary ammonium alkoxides of this invention as the sole curatives and extenders or by using them in conjunction with the widely used polyamine and polyamide curatives. Here a polyol alkoxide of the invention acted both as a flexibilizer and a curative. Specifically, 53 parts of a 75% solids toluene solution of a solid epoxy resin made by condensing bisphenol-A and epichlorohydrin, epoxy equivalent weight=500 (Epon 1001, available commercially from Shell Chemical Company), was mixed with 12 parts of the methyl glucoside polyether benzyltrimethyl-ammonium alkoxide described in Example II. The mixture was allowed to stand at 25° C. for 30 minutes and then knife-coated on tin plate with a wet film thickness of 10 mils. The films were heated at 120° C. for 10 minutes and allowed to stand at 25° C. for 24 hours. The cured films showed no loss of adhesion or cracking when bent about a ⅛-inch mandrel. After a 24-hour immersion in methyl ethyl ketone, the films showed no loss of adhesion or other signs of deterioration.

phenol-A and epichlorohydrin, epoxy equivalent weight= 195 (67 parts), was mixed with 30 parts of the quaternary ammonium alkoxide described in Example II and 30 parts of a polyamide curative, amine value 340. The mixture was then knife-coated at a 10-mil thickness on tin plate. The films were heated at 120° C. for 10 minutes and then allowed to stand at room temperature for 24 hours. Clear hard cured films were obtained which showed no cracking or loss of adhesion when bent about a ⅛-inch mandrel.

Example XXIV

This example demonstrates improved properties obtained with respect to epoxy resins which additionally contain the flexibilizers of the invention used in conjunction with anhydride curatives.

Here, 100 parts of an epoxy resin made by condensing epichlorohydrin with bisphenol-A having an epoxy equivalent weight of 195 was mixed with 35 parts of 1,2-cyclohexane dicarboxylic anhydride to give a clear solution. Then the catalyst and flexibilizer, if used, were added to the above solution. 10 gram circular castings, 2 inch in diameter were made, and cured at 120° C. for 2 hours. Results are given below in Table IV.

TABLE IV

| Catalyst | Flexibilizer | Impact, in.-lb. | Acetone resistance, percent weight change |
|---|---|---|---|
| Benzyl dimethylamine, 1 part. | None | 2 | Sample fell apart. |
| Do | PPE-600, 20 parts. | 2 | Do. |
| None | Example IV, 20 parts. | 11 | +14.0, very good appearance—no splitting. |

It can be seen from the above table that only the sample containing the flexibilizer of the invention had excellent impact strength and acetone resistance.

Example XXV

This example illustrates preparation of an alkoxide of the invention made by utilizing a hydroxy terminated polyester.

A liquid hydroxy terminated polyester was prepared by heating 34 parts of pentaerythritol and 146 parts of adipic acid at 200° C.–220° C. under a slow stream of nitrogen until about 18 parts of water was collected. Then 90 parts of 1,4-butanediol was added and the mixture stirred at 200°–220° C. until no more water came off. A vacuum was applied to remove the last traces of water and the mixture cooled to 25° C. to give a hydroxy terminated polyester having a hydroxyl number of 174.

To a flask was added 8.1 parts of a 20% methanol solution of tetramethylammonium hydroxide. Removal of 4.7 parts of solvent from the quat solution at 25° C. under reduced pressure gave a white semi-solid paste. 80 parts of the above polyester was then added to the quat paste in addition to 1.7 parts of methanol, and water was removed at 70°–80° C. under reduced pressure to yield the polyester tetramethylammonium alkoxide.

Example XXVI

Here both the polyester tetramethylammonium alkoxide of Example XXV and its unmodified polyester precursor were tested as flexibilizers for epoxy resins. Mixtures of 100 parts of the epoxy resin of Example XXIV, 20 parts of polyester flexibilizer and 9 parts of TETA were prepared and 10 gram samples cast in aluminum dishes 2 inches in diameter. Castings were cured by heating at 120° C. for 1 hour and allowed to sand for 24 hours before testing. Results are given below in Table V.

TABLE V

| Flexibilizer | Impact strength, in.-lb. | Acetone resistance, percent weight change |
|---|---|---|
| Polyester, 20 parts | 7 | +12.4, some splitting. |
| Polyester alkoxide, 20 parts | 9 | +1.7, no splitting-very good appearance. |

While the invention has been described in connection with specific embodiments thereof, it wil be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A polyol quaternary ammonium alkoxide having the following structural formula:

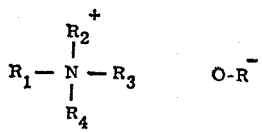

wherein $R_1$, $R_2$, $R_3$ and $R_4$ are lower alkyl or benzyl and R is the residue of (1) a propoxylated pentaerythritol having a molecular weight ranging between about 400 and 900, or (2) a propoxylated methyl glucoside having a molecular weight between 600 and 1200, (3) polyethylene oxide or (4) polypropylene oxide, or (5) a hydroxy terminated polyester prepolymer of a di- or poly-carboxylic acid and an aliphatic di- or polyhydric alcohol having at least two terminal hydroxy groups.

2. The polyol of claim 1 wherein $R_1$, $R_2$, $R_3$ and $R_4$ are methyl.

3. The polyol of claim 1 wherein R is a propoxylated methyl glucoside having a molecular weight between 600 and 1200.

4. A method for preparing a polyol quaternary ammonium alkoxide comprising:
   (a) reacting from about 1 to about 20 parts by weight of a quaternary ammonium hydroxide or alkoxide with about 100 parts by weight of a polyol so as to form water or an alcohol; and
   (b) heating the resulting mixture under reduced pressure to remove said water or alcohol as it is formed to obtain said polyol quaternary ammonium alkoxide having the following structural formula:

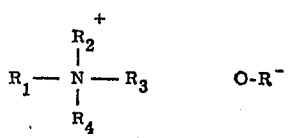

wherein $R_1$, $R_2$, $R_3$ and $R_4$ are lower alkyl or benzyl and R is the residue of (1) a propoxylated pentaerythritol having a molecular weight ranging between about 400 and 900, or (2) a propoxylated methyl glucoside having a molecular weight between 600 and 1200, (3) polyethylene oxide or (4) polypropylene oxide or (5) a hydroxy terminated polyester prepolymer of a di- or poly-carboxylic acid and a aliphatic di- or polyhydric alcohol having at least two terminal hydroxy groups.

5. The method of claim 4 wherein the quaternary ammonium hydroxide or alkoxide is tetramethyl ammonium hydroxide.

6. The method of claim 4 wherein the quaternary ammonium hydroxide or alkoxide is benzyl trimethyl ammonium hydroxide.

7. The method of claim 4 wherein the polyol is an alkoxylated pentaerythritol.

8. The method of claim 4 wherein the polyol is an alkoxylated alkyl glucoside.

9. The method of claim 4 wherein the polyol is polyethylene oxide or polypropylene oxide.

10. The method of claim 4 wherein the polyol is a hydroxy terminated polyester prepolymer of a di- or polycarboxylic acid and an aliphatic di- or polyhydric alcohol having at least two terminal hydroxy groups.

11. The method of claim 4 wherein from 2 to about 6 parts by weight of quaternary ammonium hydroxide or alkoxide are reacted with about 100 parts by weight of polyol.

References Cited

UNITED STATES PATENTS

| 2,871,236 | 1/1959 | Bryant | 260—209 |
| 2,931,753 | 4/1960 | Chesbro et al | 260—209 |
| 3,422,085 | 1/1969 | Gill et al. | 260—209 |

LEWIS GOTTS, Primary Examiner

J. R. BROWN, Assistant Examiner

U.S. Cl. X.R.

44—62; 106—14; 15 R, 19, 38.2, 279; 117—123, 126, 132, 155, 232; 252—8.3, 8.8, 387; 260—32.4, 37 EP, 209 R, 233.3 R, 475 P, 484 B, 567.6 M; 264—216, 331